Dec. 22, 1953     LE ROY T. BOSSARD     2,663,429
LIQUID OR GAS SELF-CLEANING FILTER AND STRAINER
Filed Feb. 28, 1950     3 Sheets-Sheet 1

INVENTOR.
*Leroy T. Bossard*
BY
*Mason, Fenwick & Lawrence*

ATTORNEYS

Dec. 22, 1953  LE ROY T. BOSSARD  2,663,429
LIQUID OR GAS SELF-CLEANING FILTER AND STRAINER
Filed Feb. 28, 1950  3 Sheets-Sheet 3

INVENTOR.
Leroy T. Bossard
BY
Mason, Fenwick & Lawrence
ATTORNEYS

Patented Dec. 22, 1953

2,663,429

UNITED STATES PATENT OFFICE 2,663,429

LIQUID OR GAS SELF-CLEANING FILTER AND STRAINER

Le Roy T. Bossard, Tulsa, Okla.

Application February 28, 1950, Serial No. 146,743

4 Claims. (Cl. 210—167)

This invention relates to automatic self-cleaning rotary filters, and this application is a continuation-in-part of application, Serial No. 650,023, filed February 24, 1946, now abandoned.

The original application disclosed an automatic, rotary filter wherein the perforate blades of the filter were mounted upon an axle for rotation, and positioned across the moving streams of liquid to be filtered. Accumulation of debris upon the filter blade in the path of the stream would increase the impervious area of the blade, thus causing an increase of pressure upon the blade to cause the blade assembly to rotate, removing the obstructed screen blade from the path of the liquid and substituting a clean one. The rotary blades, when moved, sweep across a stationary screen bridging the outlet of the filter and remove accumulated debris from this screen. The debris is collected in the bottom of the casing.

In this type of filter, the screen blades are of substantially the same width as the diameter of the inlet and the outlet for the passage of the liquid through the casing. This is done to keep the diameter of the filter assembly as small as possible to permit its axle to be mounted close to the mouth of the inlet to reduce the free, unsupported flow of the liquid from the inlet to the screen blade across the path of the stream. Nevertheless, gravity causes the stream to drop, so that its force strikes the blade near its mounting upon the axle. This materially reduces the effective force of the liquid for rotating the filter blade assembly. To increase the height of the blades, and thereby move the axle downward, would necessitate moving the axle farther from the inlet, thus nullifying the increased height of the blade by permitting a further drop of the center of gravity of the liquid stream.

The object of the present invention is to overcome this power loss by providing means for causing the flowing stream to strike the rotatable filter blade near their free ends to gain a mechanical advantage.

A further object of the invention is to achieve this desired result without changing the pressure upon the liquid stream, and while permitting its unrestricted flow.

A still further object is to provide increased power while maintaining a backwash to clean the dirty filters by reverse flow.

Still another object is the provision of means whereby the collection of debris within the casing will be automatically dumped when its accumulation threatens to clog the free operation of the device.

Other objects of the invention will appear from the following description of one practical embodiment of the invention, when taken in conjunction with the drawings which accompany and form a part of this specification.

Figure 1:
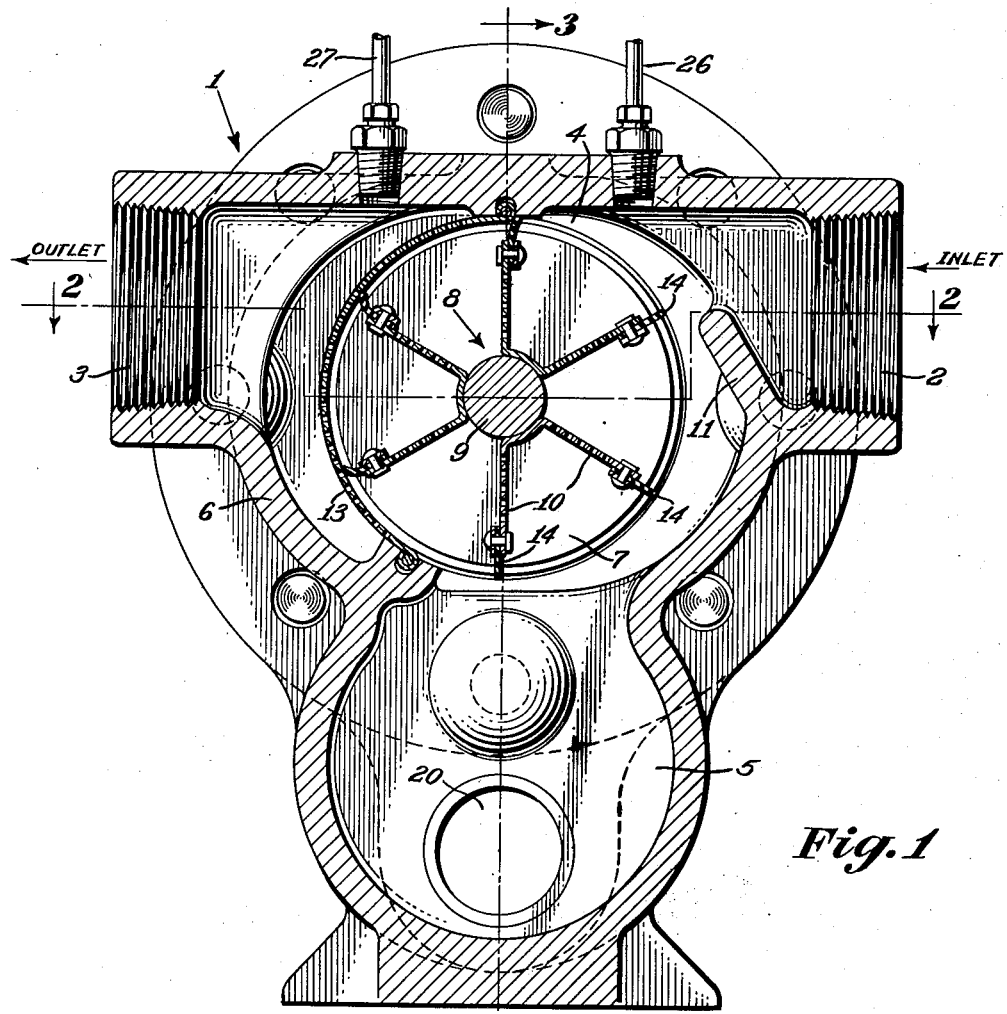
Figure 1 is a vertical section through a rotary filter incorporating the principles of the present invention.
Figure 5:
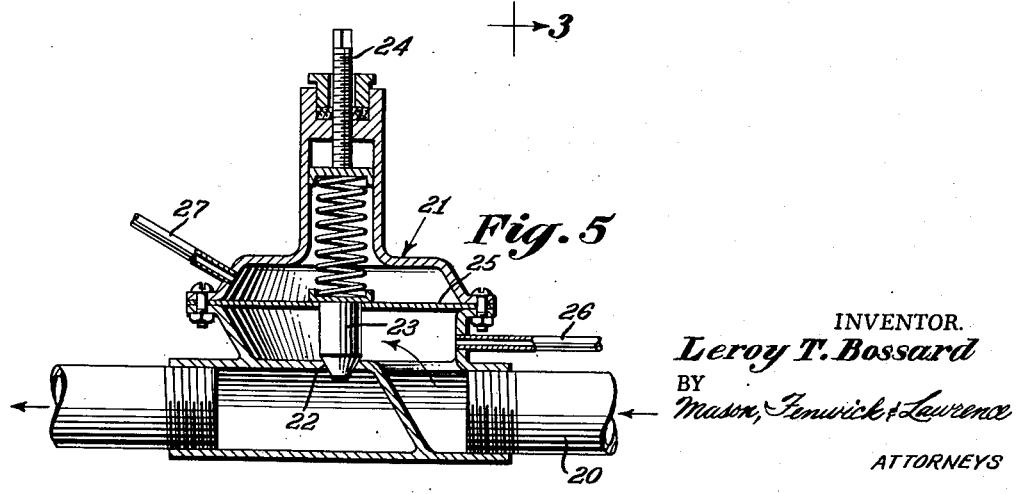
Fig. 5 is a vertical section through the automatic clean-out valve, and is taken on the line 5—5 of Fig. 4.

In brief, the invention comprises a casing in which a rotatable element having filter blades is mounted, the casing having an inlet and an outlet for liquid to be filtered and one of the filter blades being at all times positioned across the stream of liquid. The casing is provided with means to divert the course of the incoming liquid to cause the liquid, during its free, unsupported flow, to impinge upon the filter blade near the free end thereof. There is also a stationary screen to intercept debris which by-passes the filter blades, and a catch-basin for the debris, with means to automatically empty the catch-basin as required.

Referring to the drawings in detail, the casing 1 is shown as having an inlet 2 and an outlet 3, each communicating with a filtering chamber 4 centrally located within the casing and substantially cylindrical in shape, with its axis transverse to the path of flow of liquid from the inlet to the outlet. Beneath the filtering chamber, and communicating therewith, is a catch basin 5. The casing comprises a central, cast body portion 6, and end, or cap, plates 7 which close the opposite openings into the filtering chamber and form the sides thereof.

Within the filtering chamber 4 a rotatable filtering element 8 is mounted. This consists of an axle 9 and a plurality of filter blades 10. The blades may be of mesh, or other construction permitting the free passage of liquid while screening out foreign matter, but are shown as perforated plates. The blades may be individual members secured to the axle, but are shown with two blades, formed from a single piece of material. The metal is bent into a substantial flat-based V-shape, the arms of the V forming the spaced blades, and the flattened base providing a seating member to fit upon the axle and to be secured thereto. Each of the blades is rectangular in shape and extends the full width of the casing. The height of the blades is sufficient to extend from the axle to a point of contact with the casing when the blades are in upwardly extending, vertical position. The axle is positioned with its center substantially on the plane of the bottoms of the inlet and outlet. Thus, the blades, when in upright position, bridge the entire space of the normal free unsupported flow of liquid from the inlet to the outlet.

In order to offset the downward movement of the unsupported liquid when it leaves the inlet, and to insure the liquid column striking the blade near its top to secure the maximum mechanical advantage for rotating the filter element, the inlet is provided with a diverter fin 11 extending across the lower portion of the mouth of the inlet. The diverter has its upper face inclined toward the filter chamber to lift the lower position of the incoming liquid stream to raise the center of gravity of the stream. This will materially reduce the height of the stream so that the stream will emerge from the inlet in the region of the upper half of the filter blade which is in operative position. In order to maintain the pressure of the stream constant, and to prevent back pressure in the line, the inlet is widened in the region of the diverter and in accordance with the incline of the diverter, as shown at 12 in Fig. 2. This is done to keep the area of the inlet passage substantially the same throughout. The widening of the inlet passage provides an additional advantage in that the stream is broadened to impinge upon a greater widthwise area of the filter blade, and thus increase the turning force of the stream. The diverter has its outer end spaced slightly from the orbit of the filter element so that a portion of the incoming stream will pass around the bottom of the axle 9, thus providing a back flow through the blades in the lower position to thoroughly clean the debris from the perforations of the blade.

Figure 2:
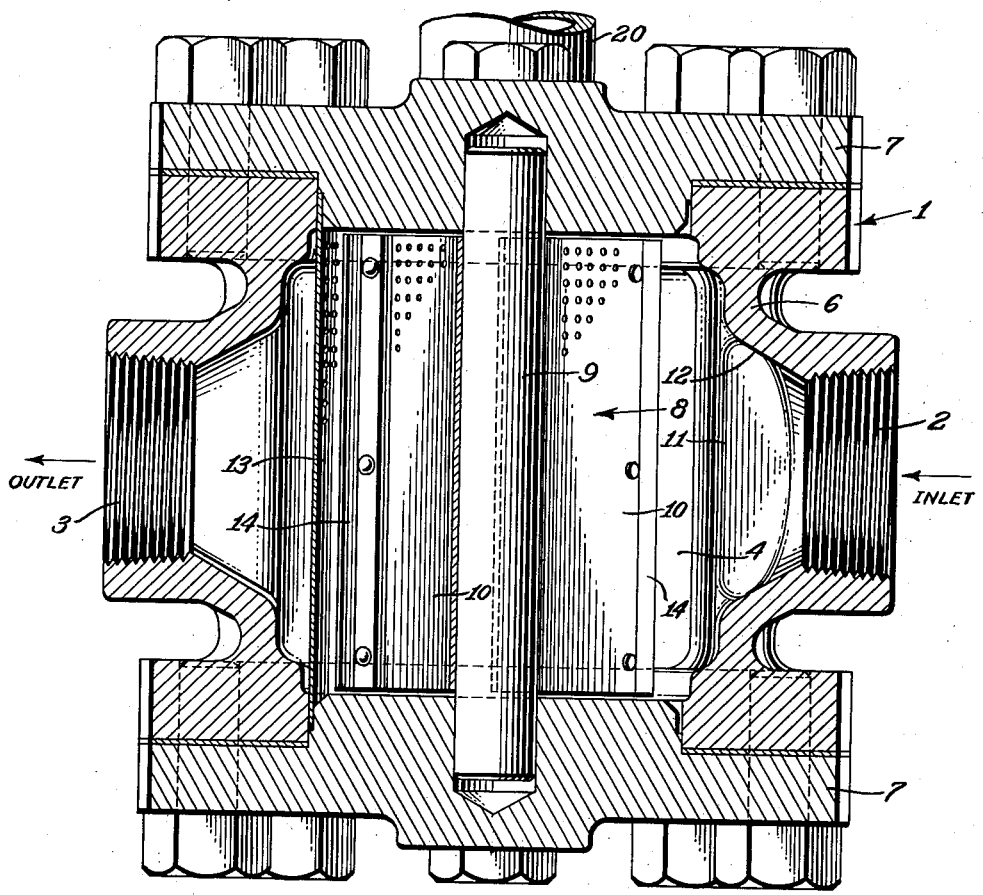
Fig. 2 is a horizontal section taken on the line 2—2 of Fig. 1.
Figure 6:
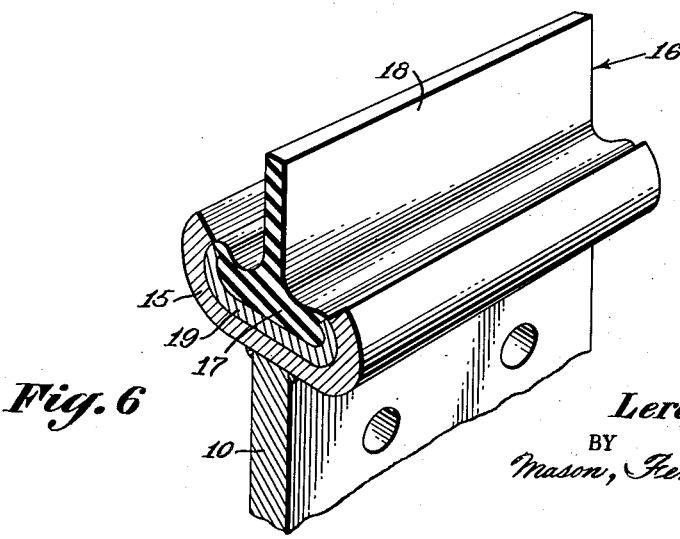
Fig. 6 is a detail perspective of a portion of one of the filter blades showing a removable type of wiper.
Figure 3:
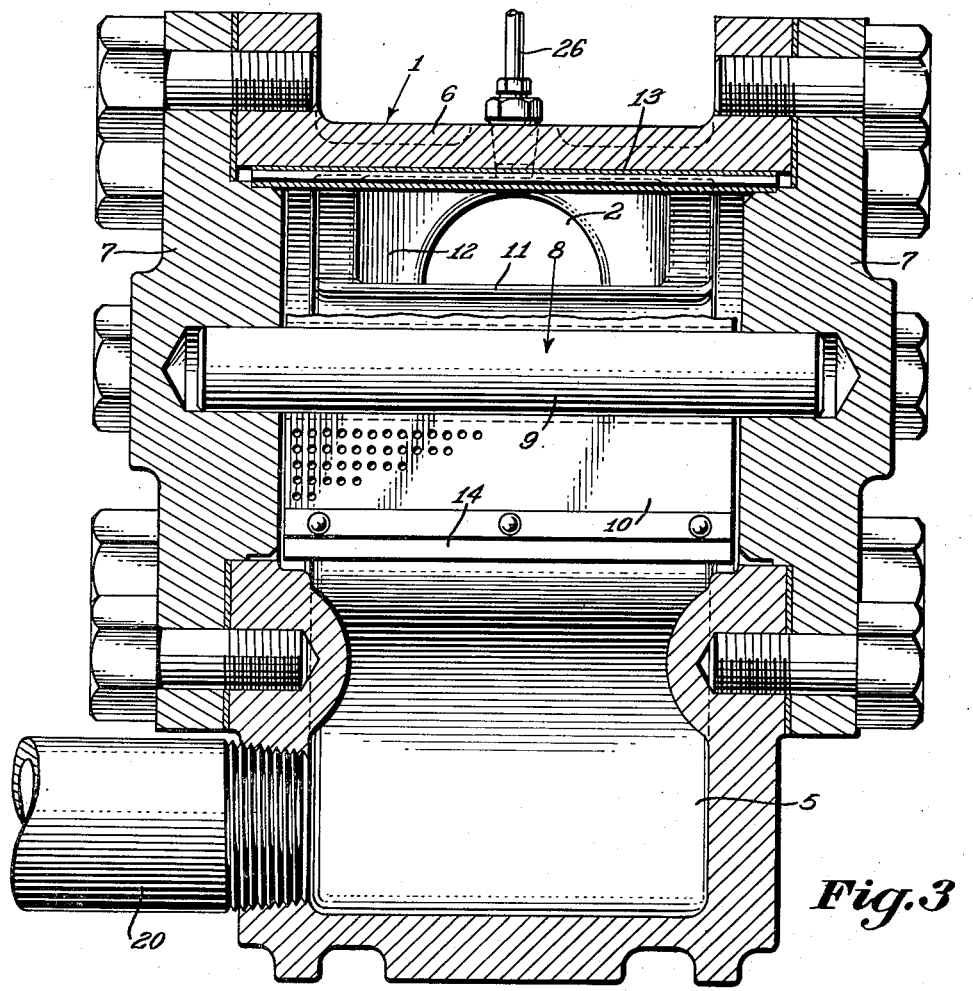
Fig. 3 is a vertical transverse section taken on the line 3—3 of Fig. 1.
Figure 4:
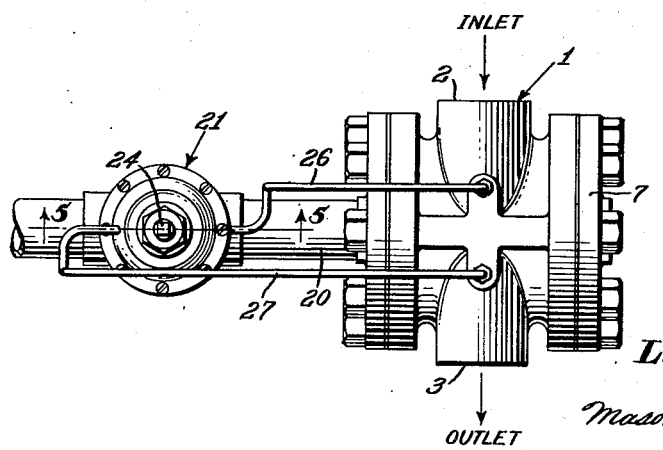
Fig. 4 is a top view of the filter and its associated clean-out valve, the view being on a reduced scale.

Adjacent the outlet side of the rotatable filter element, and completely bridging the outlet opening, is an arcuate stationary screen 13. The screen is concentric to the rotatable element and positioned to be wiped by the filter blades. Each of the blades has fixed to its outer end a flexible wiper element 14 to wipe across the screen 13, when the rotatable element turns, to remove accumulated debris from the screen. The wiper elements may be simply flat flexible strips which are riveted, or otherwise secured, to the outer ends of the blades, as shown in Figs. 1 to 3, or they may be of a removable type as shown in Fig. 6. In this latter form, the outer end of the filter blade is provided with a channel 15 extending along its outer edge, the sides of the element being curved upwardly and inwardly to a sufficient extent to bring the upper edges of the channel closer together than are the mid-points of the side walls. A T-shaped wiper element 16, having a base 17 and a blade portion 18, is fitted within the channel. The base of the wiper is shod with metal as at 19, shaped to conform to the slope of the interior of the channel. The wiper may be slid lengthwise into the channel and the matching shapes of the metal shoe and the channel will hold the wiper firmly in place and prevent it from lifting out of the channel.

As previously mentioned, there is a catch-basin 5 beneath the filtering chamber to receive the debris filtered from the liquid by the rotatable blades, and that removed by the arcuate screen and scraped off by the wiper elements on the blades. The catch-basin is provided with a drain outlet 20 equipped with an automatic dumping valve 21. The valve 21 is formed with a port 22, with which a plunger type valve 23 cooperates. The valve 23 is spring loaded, and its operating pressure may be controlled by means of adjusting nut 24. The valve is controlled by pressure differentials on opposite sides of a diaphragm 25 which is connected to the stem of valve 23. A conduit 26 has one end connected to the filter housing in communication with the filter chamber between the filter blade in operative position and the inlet, and its other end connected to the valve casing 21 beneath the diaphragm 25 so that pressure on the inlet side of the filter chamber will tend to lift valve 23 to open port 22 and dump the catch-basin. A second conduit 27 has one end connected to the filter casing in communication with the filter chamber between the arcuate screen 13 and the outlet, and its other end connected to the valve casing 21 above the diaphragm 25 so that pressure on the outlet side of the filter will tend to close port 22. The spring pressure on valve 23 is so adjusted that when screen 13 and the filter blades are clean and in proper operation, the pressure at the outlet side of the filter, transmitted through conduit 27 will be sufficient to hold valve 23 in closed position. When there has been such an accumulation of debris in the catch-basin that the various filters and screens are no longer self-cleaning, pressure will be built up on the inlet side of filter chamber 4 with a consequent reduction in pressure on the outlet side. This differential in pressure will cause an overbalancing of pressure on the diaphragm 25 and the opening of port 22 to dump and flush the catch-basin.

The operation of the device should be apparent from the above, but a brief review will be given. The filter will be connected into a line through which liquid to be filtered is flowing. The liquid will enter the inlet side of the filter to the filtering chamber, and pass first through a vertically positioned filter blade of the rotatable filter element which will screen out most of the foreign matter in the liquid. So long as the filter blade is clean, the liquid will pass freely through it and the blade will remain stationary. The liquid then is subjected to a further filtering as it passes through the fixed screen 13, which will take out particles not removed by the filter blade. The clean liquid then passes through the outlet and continues along the liquid line. Continued flow of liquid through the filter will cause the blade positioned across the liquid stream to become clogged with debris removed from the liquid. This will reduce the area through which the liquid may flow freely, and thus increase the pressure on the blade. When the pressure on the blade is sufficient to overcome the friction of the rotatable element axle in its journals, the element will be caused to rotate, moving the clogged blade from the path of liquid flow and bringing a clean one into position. The movement of the rotatable element is greatly facilitated by the action of the diverter fin 11 in lifting the column of liquid to strike the blade top to increase the turning leverage. The widening of the inlet in ratio to its depth reduction also aids in that pressure is applied to the blade across its full width. This equalizes the pressure across the entire blade and prevents localized strains upon the blade.

As the blade which was clogged is moved from operative position, the wiper element on the outer edge wipes across the fixed screen 13 to remove the accumulated debris from that screen. As the clogged blade moves through the liquid it will cause the liquid to flow in a reverse direction through the opening in the blade, thus loosening some of the debris from the blade. When the blade assumes a position below the horizontal center line, the liquid which spills over the diverter and passes to the lower side of the rotatable element will flow through the blades to further loosen the debris. As the blades tilt downwardly, the debris is dumped into the catch-basin. As explained in detail above, when dirt and trash accumulates in the catch-basin to an extent that it interferes with the free operation of the device, pressure will be built up in the inlet side of the filter chamber and cause the dumping valve to operate so that the accumulation may be flushed from the catch-basin. As soon as pressure is reduced on the inlet side and again built up at the outlet, the valve will close and normal operation will be resumed.

While in the above one practical embodiment of the invention has been disclosed, it will be apparent that changes may be made from the precise embodiment shown without departing from the scope of the invention as defined by the appended claims.

What is claimed is:

1. A filtering device comprising a housing having an inlet and an outlet and defining a passageway from said inlet to said outlet for material to be filtered, a rotatable filter element having radially projecting filtering surfaces, said filter element being so positioned in said housing that the filtering surfaces are in obstructing relation to said passageway, said element being journaled in said housing and having its axis of rotation substantially on a horizontal plane including the bottoms of said inlet and outlet, and said inlet near its outlet end having its bottom inclined upwardly toward the outlet to decrease the depth of said inlet and raise the center of gravity of the incoming stream, whereby the force of the incoming stream may be directed toward the outer edges of said rotatable element filter surfaces, said inlet diverging widthwise in the region of the depth-reduced portion thereof to maintain the cross-sectional area of the inlet substantially constant throughout.

2. In a filtering device as claimed in claim 1, a catch-basin within the housing beneath said filtering element, an outlet from said catch-basin, a diaphragm valve in said outlet and conduits connecting respectively the area within the housing on one side of said filtering element with the valve on one side of said diaphragm and the other side of the area within the housing to the valve on the opposite side of the diaphragm.

3. In a filtering device as claimed in claim 1, a fixed arcuate screen adjacent and bridging the outlet, and impervious wiper elements secured to the outer edges of said filtering surfaces to wipe across and clean said fixed screen when said filtering element is rotated.

4. In a filtering device as claimed in claim 1, a fixed arcuate screen adjacent and bridging the outlet, channel members at the edges of said filtering surfaces, and inverted T-shaped impervious flexible wiper elements adapted to slide into and be retained within said channel members.

LE ROY T. BOSSARD.

References Cited in the file of this patent

UNITED STATES PATENTS

| Number | Name | Date |
|---|---|---|
| 1,102,747 | Hauer | July 7, 1914 |
| 1,443,918 | King | Jan. 30, 1923 |
| 2,087,385 | Naujoks | July 20, 1937 |
| 2,117,789 | Cleary | May 17, 1938 |
| 2,343,843 | Horton | Mar. 7, 1944 |
| 2,347,927 | Patterson et al. | May 2, 1944 |

FOREIGN PATENTS

| Number | Country | Date |
|---|---|---|
| 18,383 | Great Britain | Nov. 7, 1896 |